(12) United States Patent
Murata et al.

(10) Patent No.: US 6,171,421 B1
(45) Date of Patent: *Jan. 9, 2001

(54) PRISM ASSEMBLY AND METHOD FOR PRODUCING THE SAME

(75) Inventors: Kazuhiko Murata; Akihiro Yokota; Kumajiro Sekine, all of Sano (JP)

(73) Assignee: Sekinos Co., Ltd., Sano (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/900,863

(22) Filed: Jul. 25, 1997

(30) Foreign Application Priority Data

Dec. 19, 1996 (JP) .................................................. 8-353919

(51) Int. Cl.[7] .............................. B29D 11/00; G02B 5/04
(52) U.S. Cl. ............................... 156/99; 264/1.7; 349/5; 359/634; 359/831
(58) Field of Search ..................... 264/1.1, 1.7; 359/831, 359/832, 634; 349/5, 6, 7, 8; 156/99

(56) References Cited

U.S. PATENT DOCUMENTS

| | | | |
|---|---|---|---|
| 4,913,528 | * | 4/1990 | Hasegawa ............................. 359/831 |
| 4,981,352 | * | 1/1991 | Tejima et al. . | |
| 5,594,591 | * | 1/1997 | Yamamoto et al. ....................... 349/5 |

FOREIGN PATENT DOCUMENTS

| | | |
|---|---|---|
| 63-10128 | 1/1988 | (JP) . |
| 3-149516 * | 6/1991 | (JP) ..................................... 359/831 |
| 8-184798 | 7/1996 | (JP) . |
| 8-292395 | 11/1996 | (JP) . |

* cited by examiner

Primary Examiner—Mathieu D. Vargot
(74) Attorney, Agent, or Firm—Oliff & Berridge, PLC

(57) ABSTRACT

The prism assembly of the present invention includes: a prism made of plastics having light transmittivity; and a glass plate which is joined to a plane of the prism obliquely intersecting a light incidence plane of the prism and whose one surface carries a dichroic layer formed thereon.

2 Claims, 23 Drawing Sheets

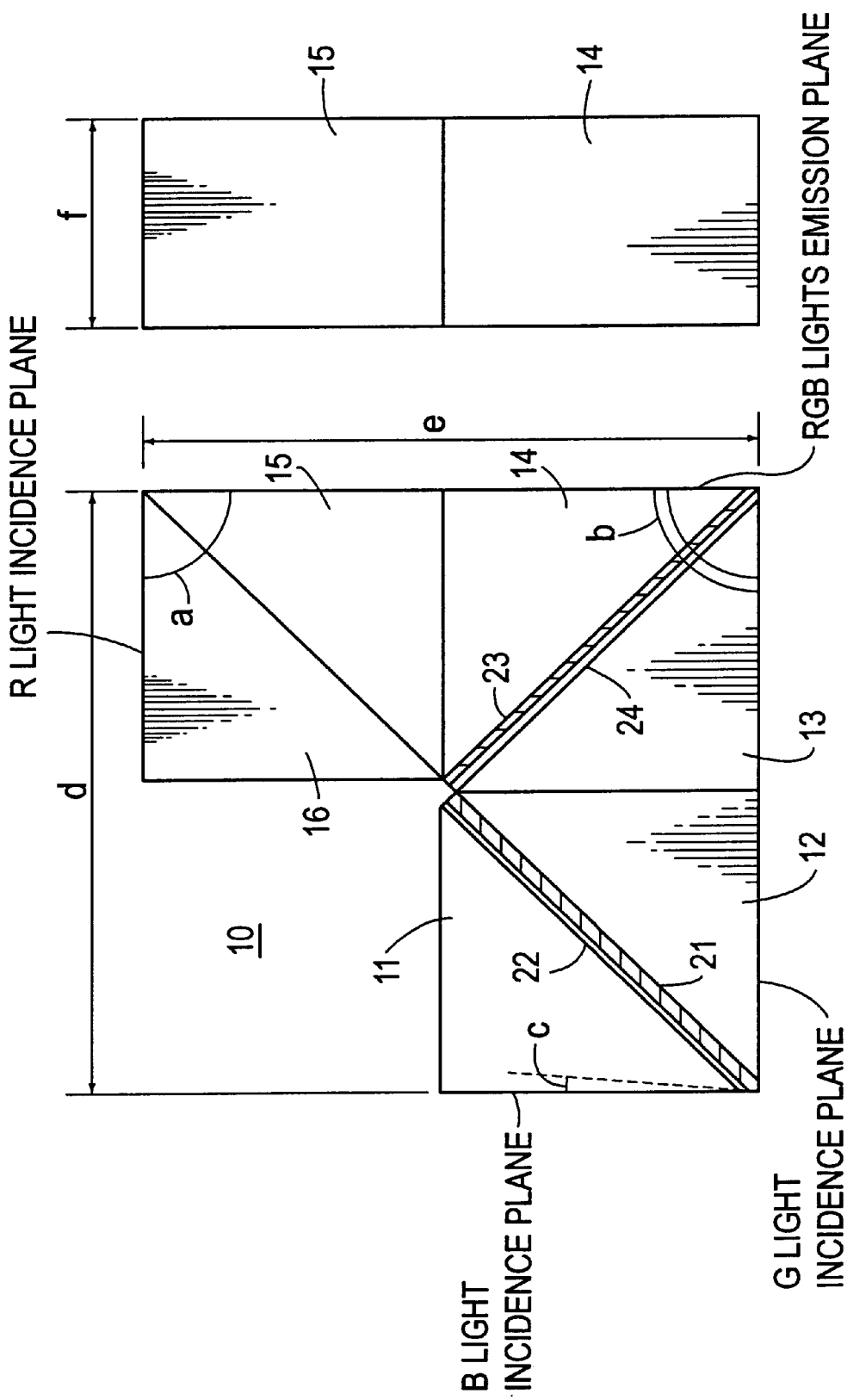

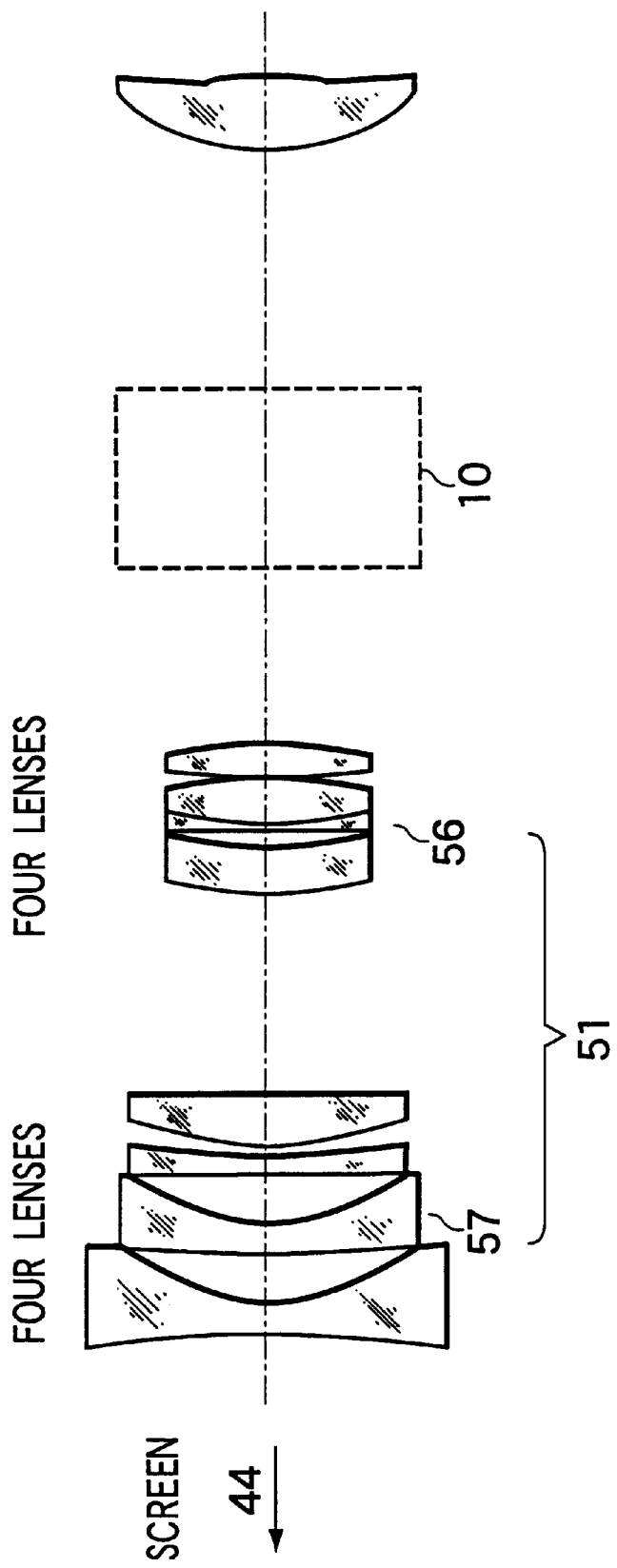

MERIDIONAL COMATIC ABERRATION
Y=0 (Y: IMAGE HEIGHT)

MERIDIONAL COMATIC ABERRATION
Y=16.51

MERIDIONAL COMATIC ABERRATION
Y=23.11

MERIDIONAL COMATIC ABERRATION
Y=29.71

SPHERICAL ABERRATION

ASTIGMATIC ABERRATION
(Y: IMAGE HEIGHT)

DISTORTION ABERRATION
(Y: IMAGE HEIGHT)

MERIDIONAL COMATIC ABERRATION
Y=0 (Y: IMAGE HEIGHT)

MERIDIONAL COMATIC ABERRATION
Y=23.11

MERIDIONAL COMATIC ABERRATION
Y=29.72

ASTIGMATIC ABERRATION
(Y: IMAGE HEIGHT)

DISTORTION ABERRATION
(Y: IMAGE HEIGHT)

PRISM ASSEMBLY AND METHOD FOR PRODUCING THE SAME

BACKGROUND OF THE INVENTION

1. Field of the Invention

The present invention relates to a prism assembly and a method for producing the prism assembly. More specifically, the present invention relates a prism assembly which performs color separation and color synthesis in, for example, an optical system in a liquid crystal projector or the like.

2. Description of the Related Art

Conventionally, in an optical system in a liquid crystal projector or the like, a prism assembly which performs color separation and color synthesis is used.

As shown in FIGS. 23A and 23B, a conventional prism assembly 90 of this type includes, for example, prisms 91 to 94 made of glass, and dichroic layers 96 and 97 formed on specific planes of the prisms 91 to 94.

In the conventional prism assembly 90, as shown in FIGS. 23A and 23B, red light is introduced through a light incidence plane denoted by the reference symbol "R light incidence plane"; green light is introduced through a light incidence plane denoted by the reference symbol "G light incidence plane"; and blue light is introduced through a light incidence plane denoted by the reference symbol "B light incidence plane". Also, red, green and blue lights are emitted through a light emission plane denoted by the reference symbol "RGB lights emission plane". Incidentally, each of these reference symbols denotes the same plane in the following description.

The conventional prism assembly 90 having the above-mentioned constitution is produced by the following method.

Incidentally, in the following description, each of the prisms constituting the prism assembly has five planes: three rectangular side planes and two right-angled-triangle-shaped base planes. Of these side planes, two side planes including the sides forming the right angle of the right-angled-triangle-shaped base plane are referred to as a "first plane" and a "second plane", while the side plane including the hypotenuse of the triangle serving as the base plane is referred to a "third plane".

Firstly, a glass block is roughly processed by pressing or cutting so as to form a rough contour of a prism of the prism assembly 90.

Next, the roughly processed glass block is attached on a plate by means of paraffin, and then the first plane of the prism is processed.

The processing of the first plane includes rough shaving to a predetermined thickness, semi-finishing, and finishing, performed in this order. In the rough shaving, abrasive grains of C# 80 are used; in the semi-finishing, abrasive grains of A# 120 to 280 are used; and in the finishing, abrasive grains of A# 400 to 600 are used.

Thereafter, the paraffin is removed from the prism, and the prism is washed.

After the first plane is processed, the second plane and then the third plane are processed in the same steps as in the first plane.

In this way, the prisms 91 to 94 are produced.

Incidentally, a stock allowance for sanding and polishing each of the side planes is expected to be 0.07 to 0.1 mm for each of the side planes.

Thereafter, dichroic films 96 and 97 are directly coated on specific planes of the glass prism 92. Then, the glass prisms 91 to 94 are joined to form the prism assembly 90.

However, in the glass prisms 91 to 95 thus processed, the opposed sides of each plane are unfavorably liable to fail to be in parallel, so that pyramidal errors (falling-down errors) are liable to occur.

To avoid such errors, the producer must process the prisms 91 to 94 while paying attention to the following points in each of the steps of rough shaving, semi-finishing, and finishing. That is, in the processing of the third plane performed after processing the first and second planes, the producer must pay attention to causing the two angles formed between the third plane and the first and second planes (i.e., the two angles formed at both ends of the hypotenuse of the right-angled triangle-shaped base plane) to become equal to each other, and to causing the angles formed between the first to third planes and the upper and lower base planes to become right angles.

Because of the constitution and the production method as described above, in the conventional prism assembly and the conventional method for producing the prism assembly, a skilled expert needs to take a long time in order to produce a prism assembly having satisfactory precision in prism angles and planes. Consequently, according to the conventional method, it is difficult to produce such a prism assembly efficiently.

SUMMARY OF THE INVENTION

The present invention is accomplished in view of the above-mentioned problems of the conventional prism assembly and the conventional method for producing a prism assembly.

It is therefore an object of the present invention to provide a prism assembly which has stable precision in prism angles and planes and is suitable for mass-production.

It is another object of the present invention to provide a method for preferably producing such a prism assembly.

To achieve the above-mentioned objects, a first aspect of the invention provides a prism assembly including: a prism made of plastics having light transmittivity; and a glass plate which is joined to a plane of the prism obliquely intersecting a light incidence plane of the prism and whose one plane carries a dichroic layer formed thereon.

In the prism assembly according to the first aspect of the present invention, since the prisms are made of plastics which allows the prism angles and the dimensions of the prism to be changed easily, the prism assembly can take various shapes and dimensions.

Also, since the dichroic layer is formed on a glass plate which exhibits excellent plane precision, the dichroic layer can exhibit excellent plane precision. Accordingly, the prism assembly according to the first aspect of the present invention can realize dichroic properties of the same level as in the conventional prism assembly.

Further, a second aspect of the present invention provides a prism assembly having the features of the first aspect of the present invention and a feature that at least one of a plane serving as a light incidence plane of the prism assembly and a plane serving as a light emission plane of the prism assembly is shaped in the form of a lens.

In the prism assembly according to the second aspect of the present invention, since the prism assembly itself serves as a lens, the optical system placed after the prism assembly can have simple constitution.

Specifically, when the prism assembly according to the second aspect of the present invention is used for, for example, a liquid crystal projector having a lens group serving as a projection optical system for projecting the light emitted from the prism assembly to the screen, the number of lenses in the lens group can be reduced by at least one.

Further, a third aspect of the present invention provides a method for producing a prism assembly, including: a first step of forming a prism by injection-molding plastics having light transmittivity; a second step of forming a dichroic layer on a surface of a glass plate; and a third step of joining the glass plate carrying the dichroic layer formed thereon to a specific plane of the prism.

In the method for producing a prism assembly according to the third aspect of the present invention, since the prism is formed by injection-molding plastics having light transmittivity at the first step, the prism can be easily formed into a prism in conformity with desired specifications of the prism in prism angle and dimension.

Also, in the method for producing a prism assembly according to the third aspect of the present invention, the dichroic layer is formed on a glass plate at the second step performed before, after, or in parallel with the first step, and the glass plate carrying the dichroic layer formed thereon is joined to a specific plane of the prism at the third step. Accordingly, the prism assembly according to the first aspect of the present invention can be produced preferably.

Further, a fourth aspect of the present invention provides a method for producing a prism assembly having the features of the third aspect of the present invention and a feature that at least one of a plane serving as a light incidence plane of the prism assembly and a plane serving as a light emission plane of the prism assembly is shaped in the form of a lens.

In the method for producing a prism assembly according to the fourth aspect of the present invention, since at least one of the plane serving as a light incidence plane and the plane serving as a light emission plane is shaped in the form of a lens at the first step and the following steps are the same as in the of the present invention, the prism assembly according to the second aspect of the present invention can be produced preferably.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIGS. 1A and 1B are elevation and right side elevation views; of the prism assembly according to a first embodiment of the present invention;

FIG. 5 is view showing in detail the structure of the projection lens system of the liquid crystal projector shown in FIG. 4A;

DETAILED DESCRIPTION OF THE INVENTION

Figure 2A:
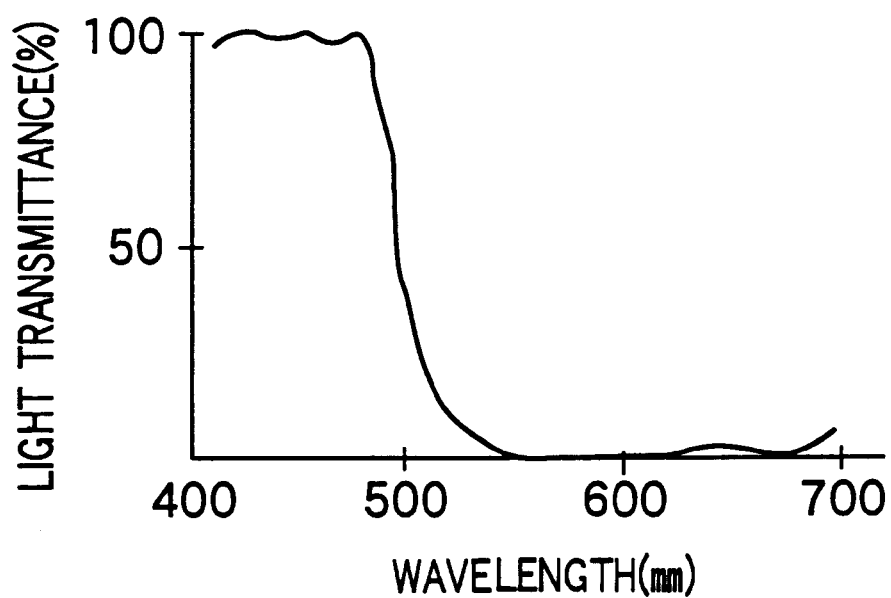
FIG. 2A shows a graph illustrating the relationship between wavelengths and the light transmittance of a dichroic layer having properties of transmitting blue light and reflecting green light.

Hereinafter, embodiments of the present invention will be described referring to the attached drawings.

First Embodiment

Firstly, referring to FIGS. 1A and 1B, a first embodiment of the prism assembly according to the present invention will be described.

As shown in FIG. 1, the prism assembly 10 according to the first embodiment of the present invention includes: prisms 11 to 16 each made of plastics having light transmittivity (e.g., PMMA (polymethyl methacrylate)); and glass plates 21 and 23. The glass plates 21 and 23 are joined to planes of the prisms 12 and 14 obliquely intersecting light incidence planes of the prisms 12 and 14. The glass plates 21 and 23 have surfaces carrying dichroic layers 22 and 24 formed thereon, respectively.

The prism assembly 10 according to the first embodiment is produced by the following method.

Firstly, plastics having light transmittivity (e.g., PMMA (polymethyl methacrylate)) is injection-molded to form prisms 11 to 16. It is preferred to perform such injection-molding by using "Cycap 200t", which is a molding machine produced by SUMITOMO HEAVY INDUSTRIES, LTD., and a mold at a molding cycle of 300 seconds.

In parallel with, before or after the forming of the prisms 11 to 16, dichroic layers 22 and 24 are coated on the glass plates 21 and 23, respectively.

Thereafter, the glass plate 21 is joined to the prism 12, the glass plate 23 is joined to the prism 14, and the prisms 11 to 16 are joined. Thus, the prism assembly 10 is produced.

Examples of the adhesive used for such joining include unsaturated polyester resins, epoxy resins, and monoliquid-type low viscosity UV adhesives. From the viewpoint of environment-resistance properties, adhesives made of silicones are preferred.

The inventors of the present invention conducted an environment-resistance test on the prism assembly 10 produced by the above-mentioned method. The environment-resistance test consists of (i) a heat-run test conducted at 70° C. for 168 hours, (ii) a high-temperature high-humidity test at 60° C. and humidity of 90%, and (iii) a low-temperature test conducted at −10° C. for 168 hours.

In the environment-resistance test, change in the shape of the prism assembly 10 and change in the outer appearance thereof were observed. The change in the shape of the prism assembly 10 was measured by the angles a, b and c, and the dimensions d, e and f shown in FIGS. 1A and 1B.

Table 1 shows the results obtained 24 hours after finishing the above-mentioned environment-resistance test.

As is known from Table 1, the shape of the prism assembly 10 did not change before and after the environment-resistance test.

Further, no exfoliation at the joined portions was observed as a result of the observation of the outer appearance of the prism.

TABLE 1

|  | Initial Value | After Environment-resistance Test | | |
|  |  | Heat-run Test | High-temperature High-humidity Test | Low-temperature Test |
| --- | --- | --- | --- | --- |
| Angle a | 91.5° | 91.6° | 91.5° | 91.5° |
| Angle b | 91.3° | 91.4° | 91.4° | 91.2° |
| Angle c | 0.4° | 0.3° | 0.3° | 0.4° |
| Dimension d | 50.5 mm | 50.4 mm | 50.4 mm | 50.6 mm |
| Dimension e | 50.2 mm | 50.3 mm | 50.2 mm | 50.2 mm |
| Dimension f | 25.3 mm | 25.3 mm | 25.4 mm | 25.1 mm |

In the prism assembly 10 according to the first embodiment of the present invention, since the prisms 11 to 16 are made of plastics, desired prism angles and desired dimensions of the prism can be realized. Accordingly, prism assembly having various shapes and dimensions can be easily produced.

Also, in the prism assembly 10, since the dichroic layers 22 and 24 serving as dichroic planes which require excellent plane precision are formed on the surfaces of glass plates 21 and 23 which exhibit an excellent plane precision, plane precision of the dichroic layers 22 and 24 becomes excellent. Accordingly, the prism assembly 10 of the first embodiment can exhibit dichroic properties of the same level as in the conventional prism assembly.

Figure 2B:
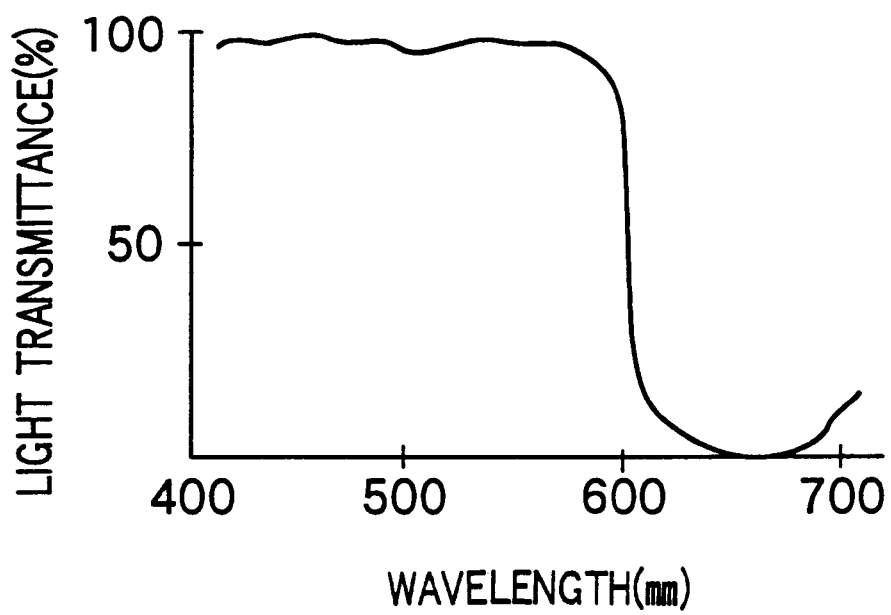
FIG. 2B shows a graph illustrating the relationship between the wavelengths and the light transmittance of a dichroic layer having properties of transmitting blue and green lights and reflecting red light.

This is endorsed by FIGS. 2A and 2B. FIG. 2A shows a graph illustrating the relationship between wavelengths and the light transmittance of a dichroic layer 22 having properties of transmitting blue light and reflecting green light. FIG. 2B shows a graph illustrating the relationship between the wavelengths and the light transmittance of a dichroic layer 24 having properties of transmitting blue and green lights and reflecting red light.

Second Embodiment

Next, referring to FIG. 3, a second embodiment of the prism assembly according to the present invention will be described. It should be noted that identical elements or members are denoted by identical reference numerals or symbols, and the same features as in the first embodiment are not detailed.

Figure 3:
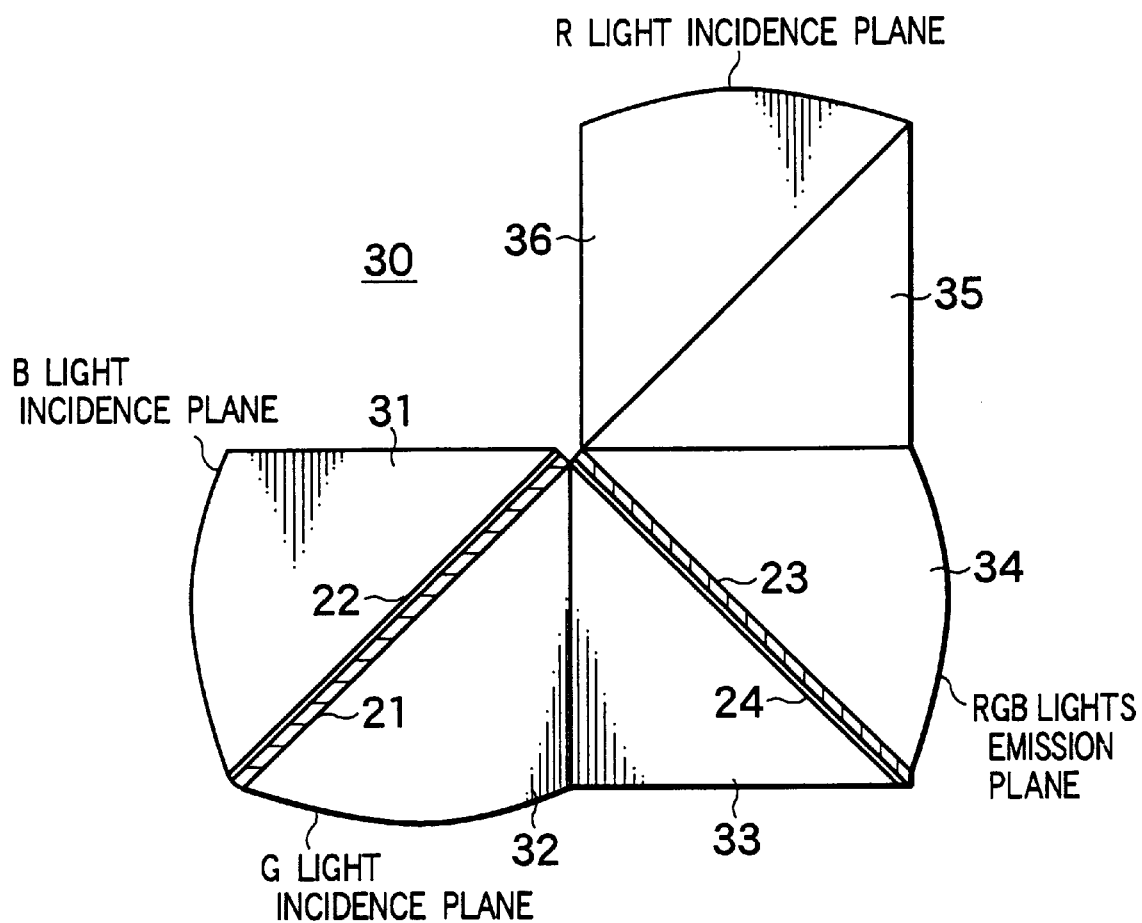
FIG. 3 is a view showing a prism assembly according to a second embodiment of the present invention.

As shown in FIG. 3, the prism assembly 30 according to the second embodiment of the present invention includes: prisms 11 to 16 each made of plastics having light transmittivity (e.g., PMMA (polymethyl methacrylate)); and glass plates 21 and 23 which are joined to planes of the prisms 12 and 14 obliquely intersecting light incidence planes of the prisms 12 and 14 and which have surfaces carrying dichroic layers 22 and 24 formed thereon, respectively. The prism assembly 30 of the second embodiment is different from the prism assembly 10 of the first embodiment in that at least one of a plane serving as a light incidence plane of the prism assembly and a plane serving as a light emission plane of the prism assembly is shaped in the form of a lens. More specifically, in the prism assembly 30, the red light incidence plane denoted by R light incidence plane, the green light incidence plane denoted by G light incidence plane, the blue light incidence plane denoted by B light incidence plane, and the red, green and blue lights emission plane denoted by RGB lights emission plane are each shaped in the form of a lens.

The prism assembly 30 having the above-mentioned shape is produced by the same method as in the first embodiment except for changing the shape of the mold.

In the prism assembly 30 according to the second embodiment of the present invention, since the prism assembly 30 itself serves as a lens, the optical system placed after the prism assembly 30 can be constructed simply.

Figure 4A:
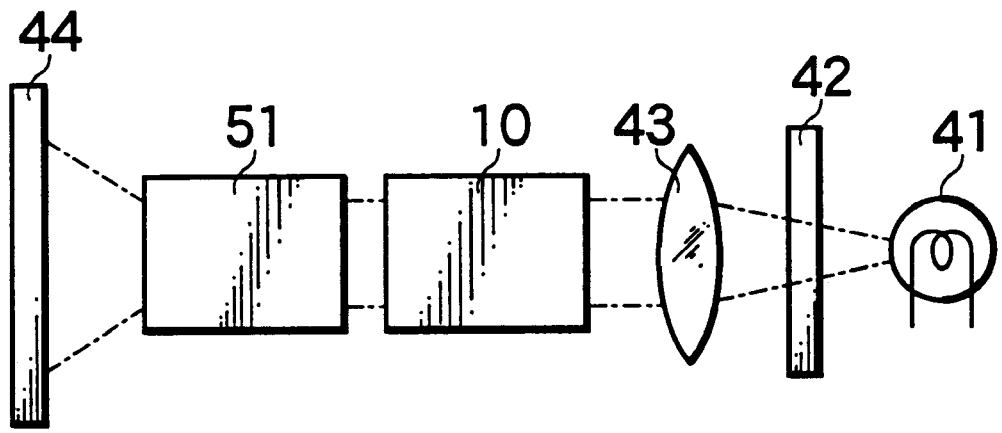
FIG. 4A is a schematic view showing a liquid crystal projector having the prism assembly according to the first embodiment shown in FIGS. 1A and 1B.
Figure 4B:
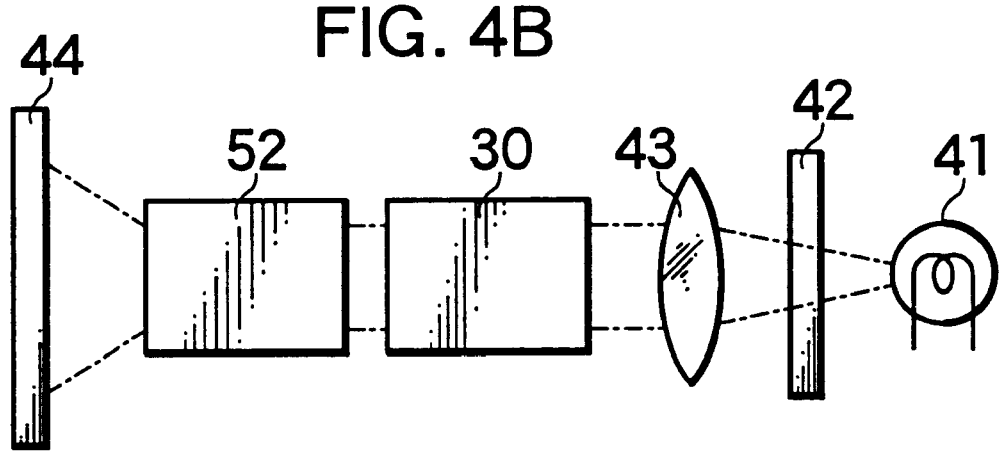
FIG. 4B is a schematic view showing a liquid crystal projector having the prism assembly according to the second embodiment shown in FIG. 3.
Figure 6:
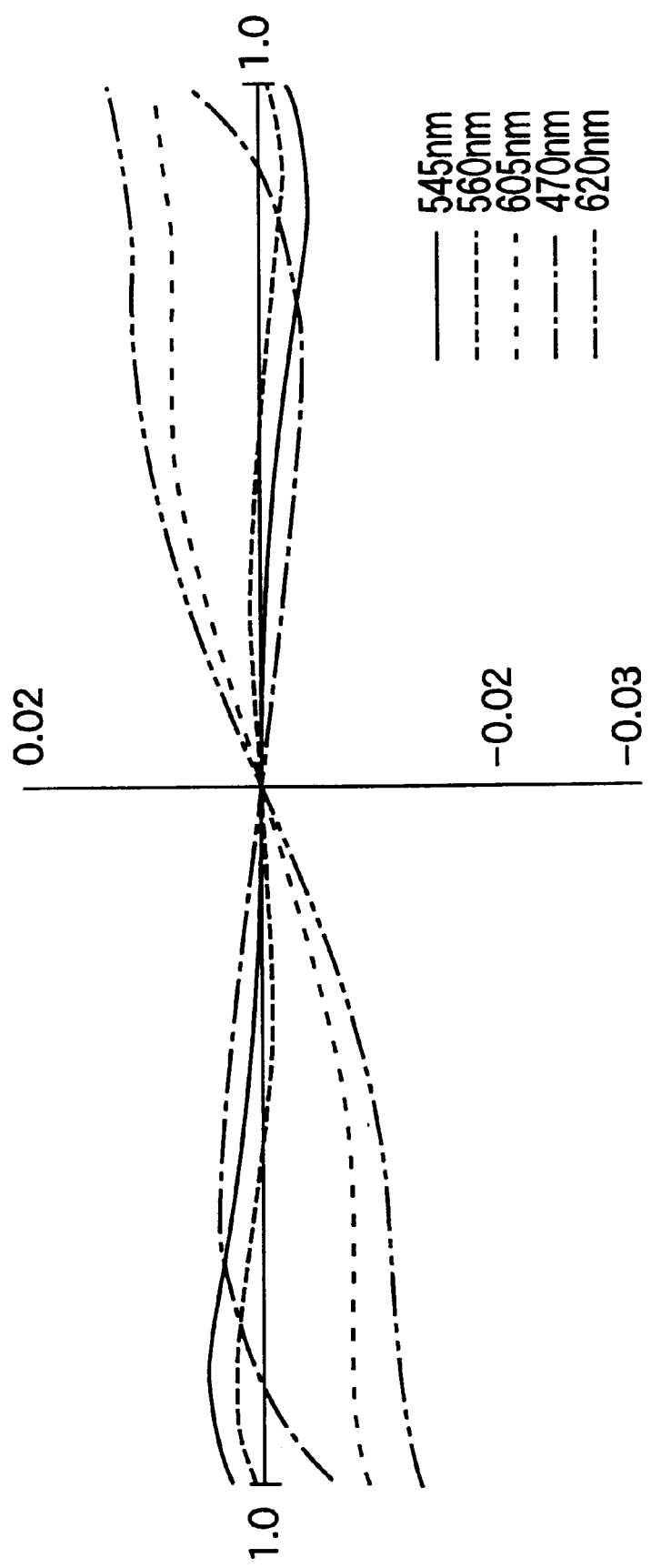
FIG. 6 shows a graph illustrating the comatic aberration of the optical system in the liquid crystal projector shown in FIG. 4A.
Figure 7:
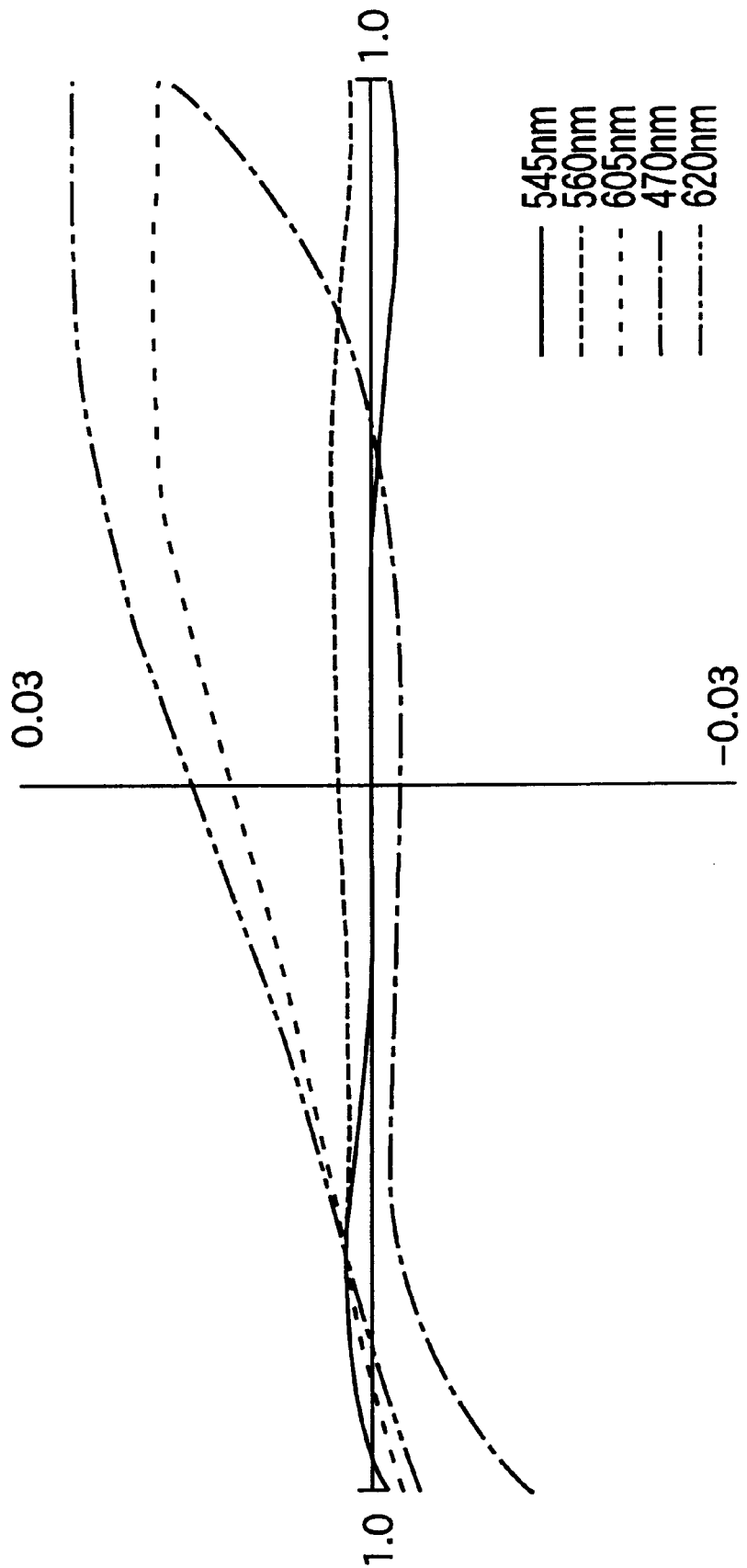
FIG. 7 shows another graph illustrating the comatic aberration of the optical system in the liquid crystal projector shown in FIG. 4A.
Figure 8:
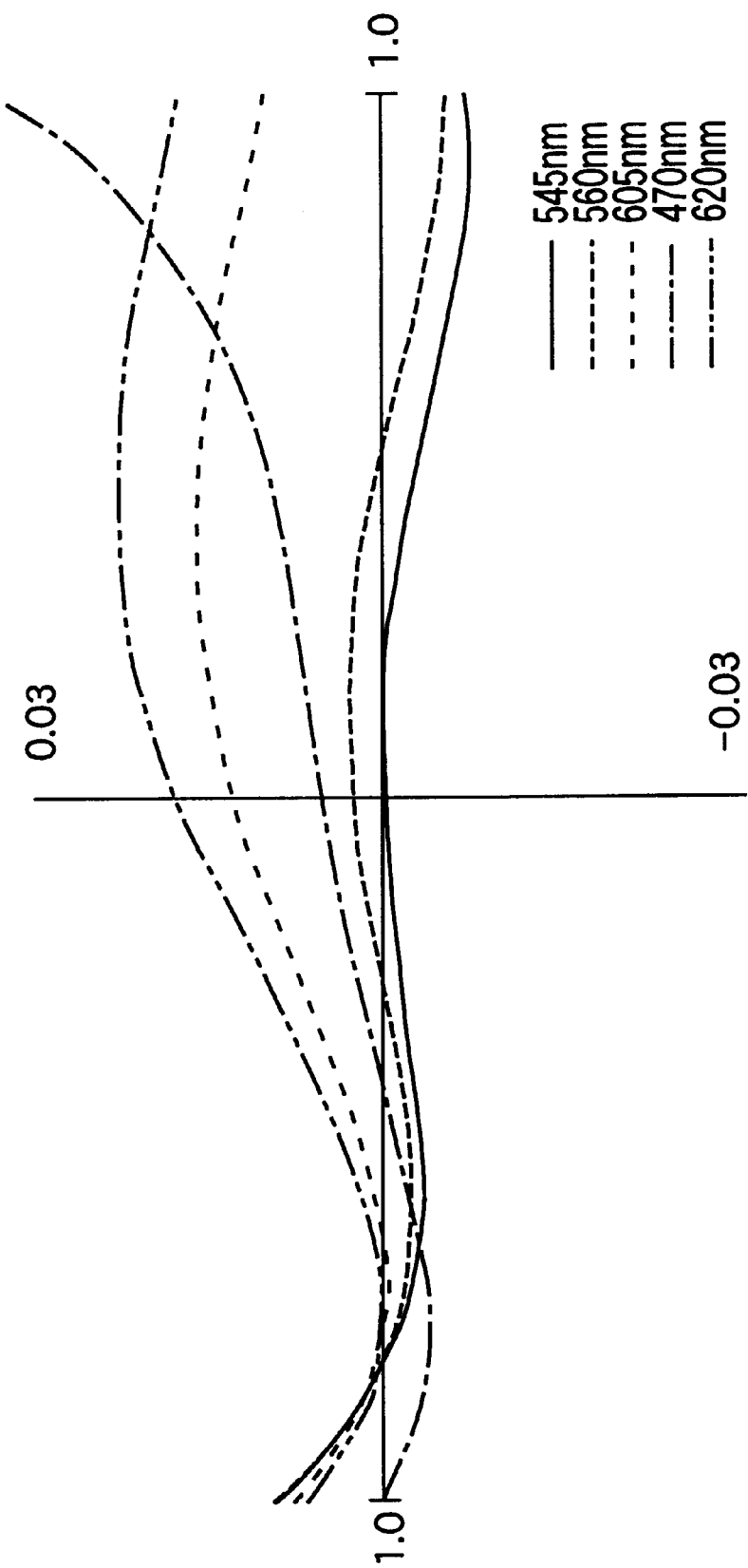
FIG. 8 shows still another graph illustrating the comatic aberration of the optical system of the liquid crystal projector shown in FIG. 4A.
Figure 9:
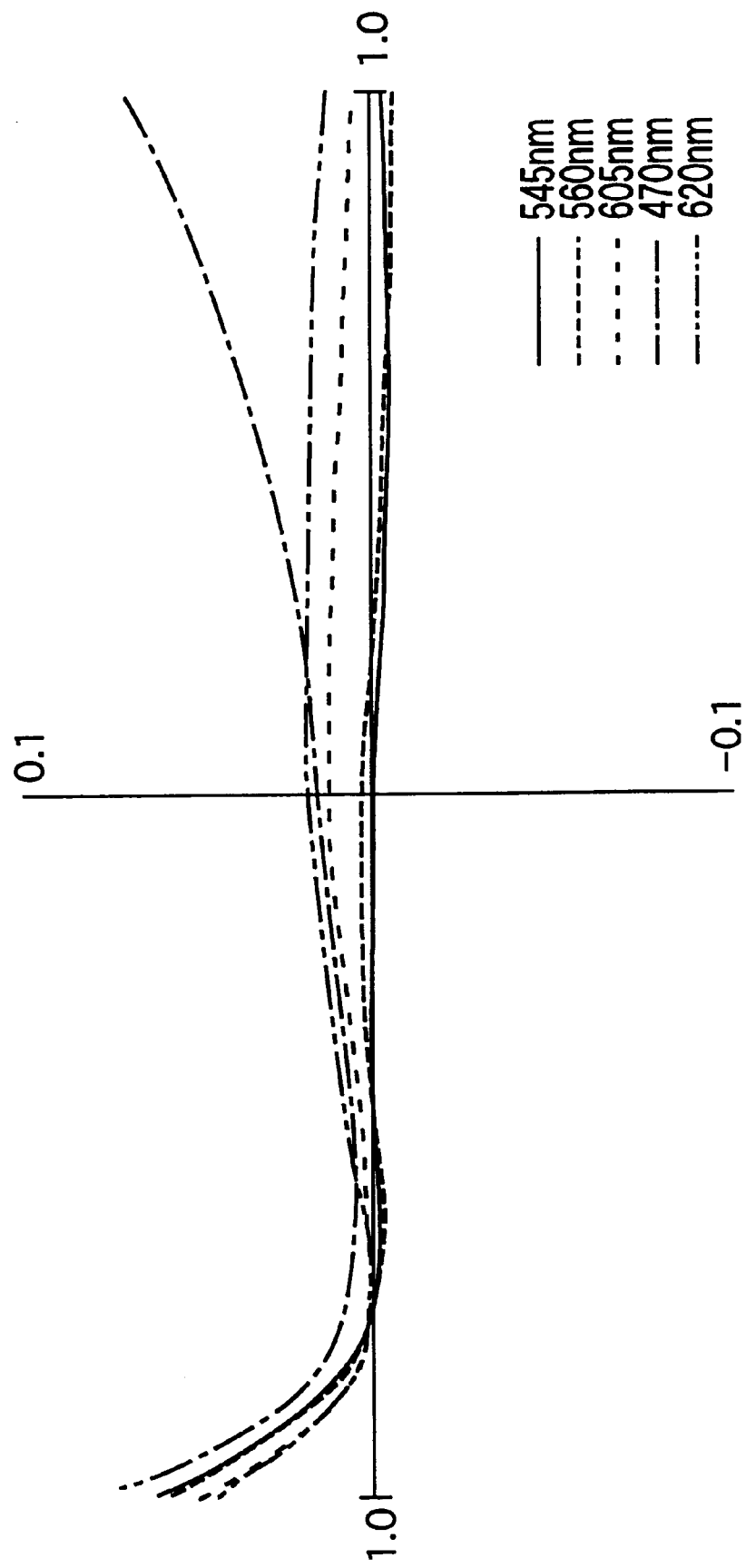
FIG. 9 shows yet another graph illustrating the comatic aberration of the optical system in the liquid crystal projector shown in FIG. 4A.
Figure 10:
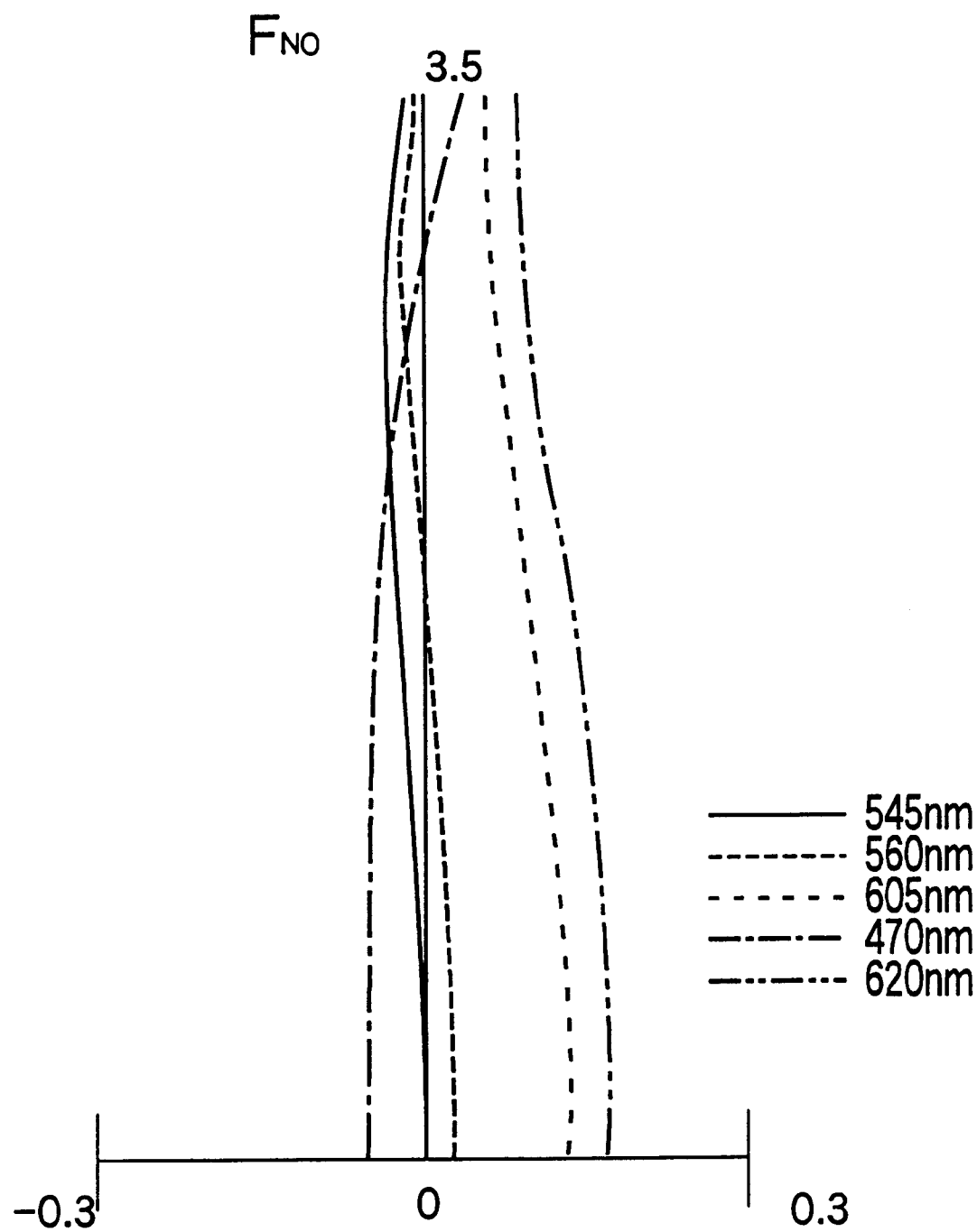
FIG. 10 shows a graph illustrating the spherical aberration of the optical system in the liquid crystal projector shown in FIG. 4A.
Figure 11:
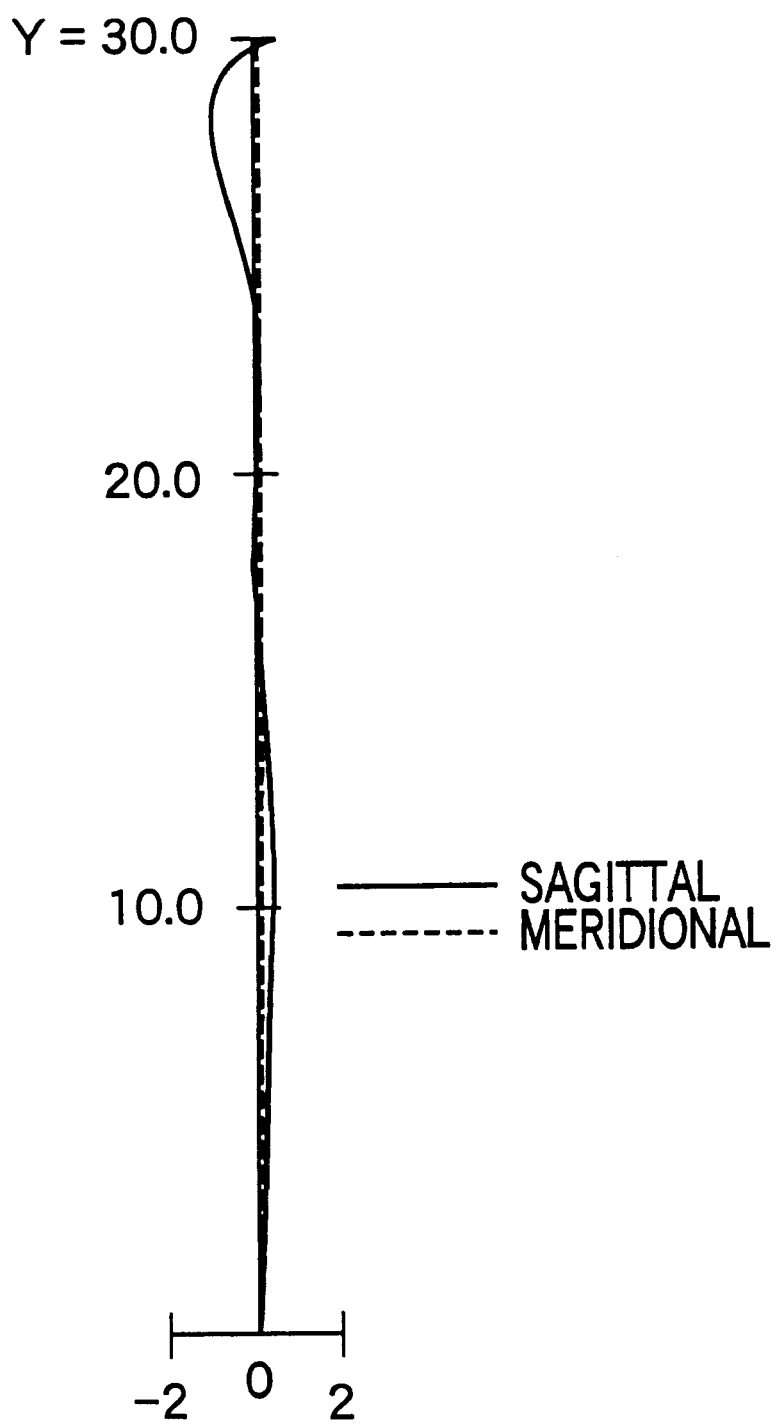
FIG. 11 shows a graph illustrating the astigmatic aberration of the optical system in the liquid crystal projector shown in FIG. 4A.
Figure 12:
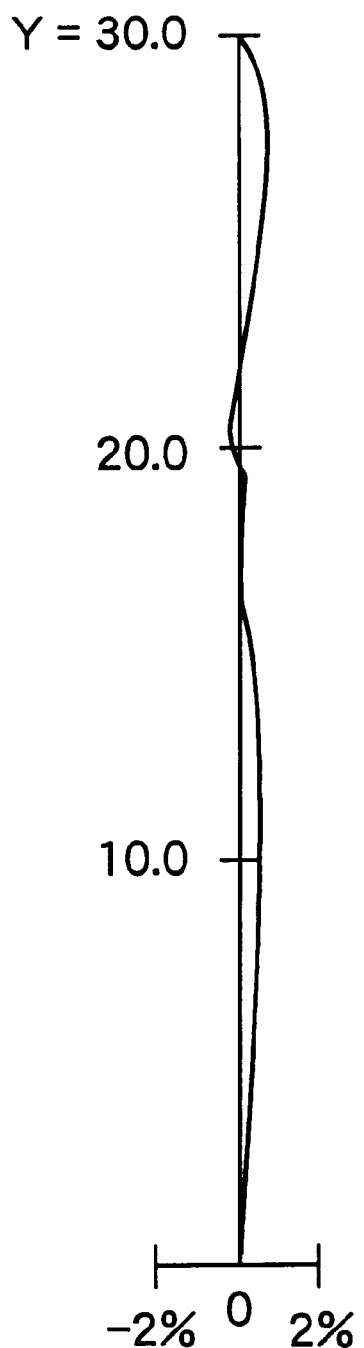
FIG. 12 shows a graph illustrating the distortion aberration of the optical system in the liquid crystal projector shown in FIG. 4A.
Figure 13:
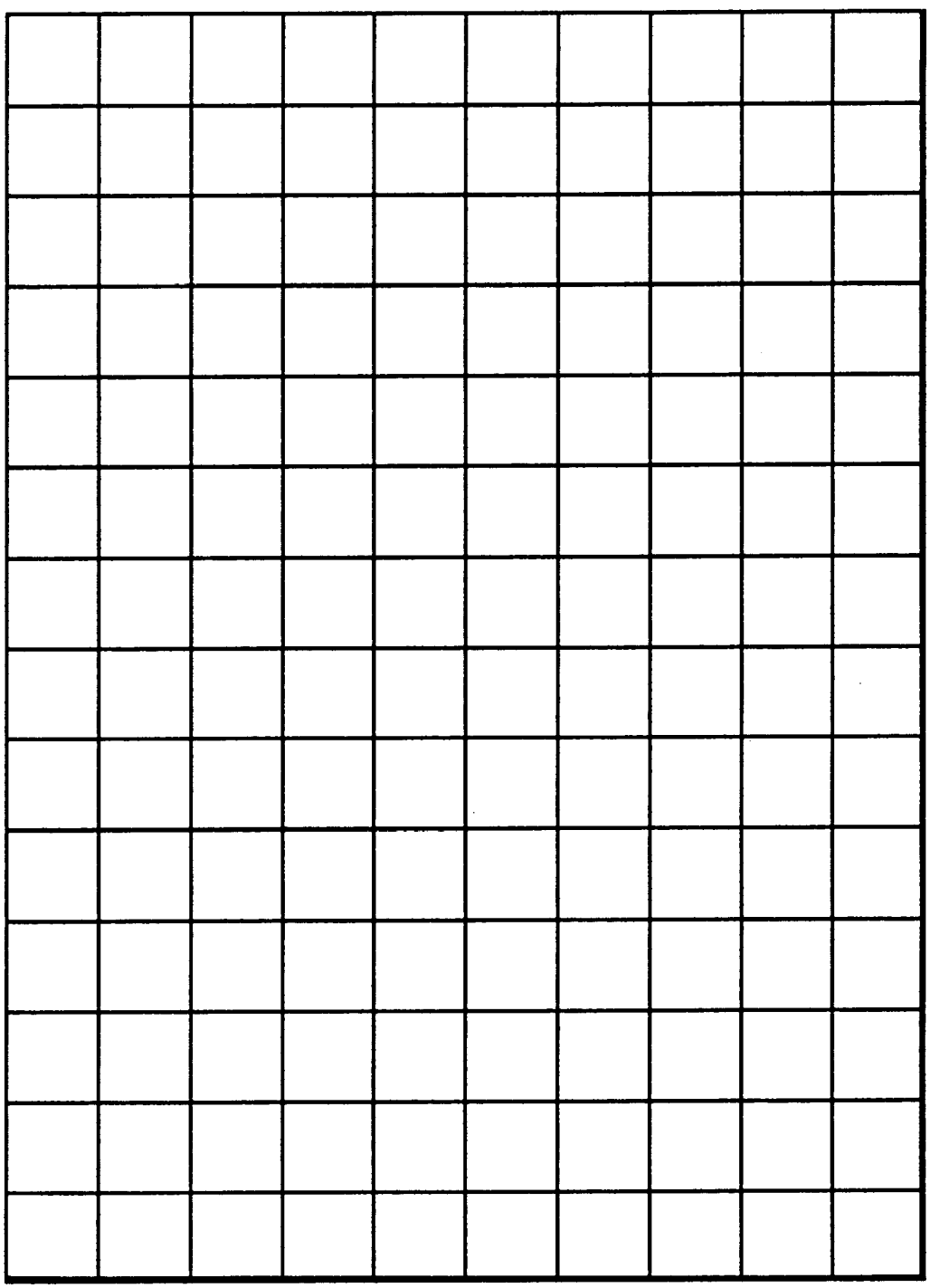
FIG. 13 is a view showing a simulation of an image subjected to distortion aberration of the optical system in the liquid crystal projector shown in FIG. 4A.

This is known from the comparison tests conducted by the inventors of the present invention between the prism assembly 10 of the first embodiment and the prism assembly 30 of the second embodiment. Hereinafter, the comparison tests thus conducted are explained referring to FIGS. 4A to 22. FIG. 4A is a schematic view showing a liquid crystal projector having the prism assembly according to the first embodiment shown in FIGS. 1A and 1B. FIG. 4B is a schematic view showing a liquid crystal projector having the prism assembly according to the second embodiment shown in FIG. 3.

As shown in FIGS. 4A and 4B, each of the liquid crystal projectors having the prism assembly 10 and the liquid crystal projector having the prism assembly 30 has a light source 41, a TFT (thin film transistor) panel 42, a field lens 43, and a screen 44. The difference therebetween is that the liquid crystal projector having the prism assembly 10 has a projection lens system 51 while the liquid crystal projector having the prism assembly 30 has a projection lens system 53.

It should be noted that the projection lens systems 51 and 53 are designed such that the aberration properties of the liquid crystal projector having the prism assembly 10 as shown in FIG. 4A is substantially equal to those of the liquid crystal projector having the prism assembly 30 as shown in FIG. 4B.

The constitution of the projector lens system 51 is shown in detail in FIG. 5. Specifically, the projection lens system 51 includes a lens group 56 constituted by four lenses and a lens group 57 constituted by four lenses. Incidentally, the aberration properties of the optical system as shown in FIG. 4A are shown in FIGS. 6 to 13.

Figure 14:
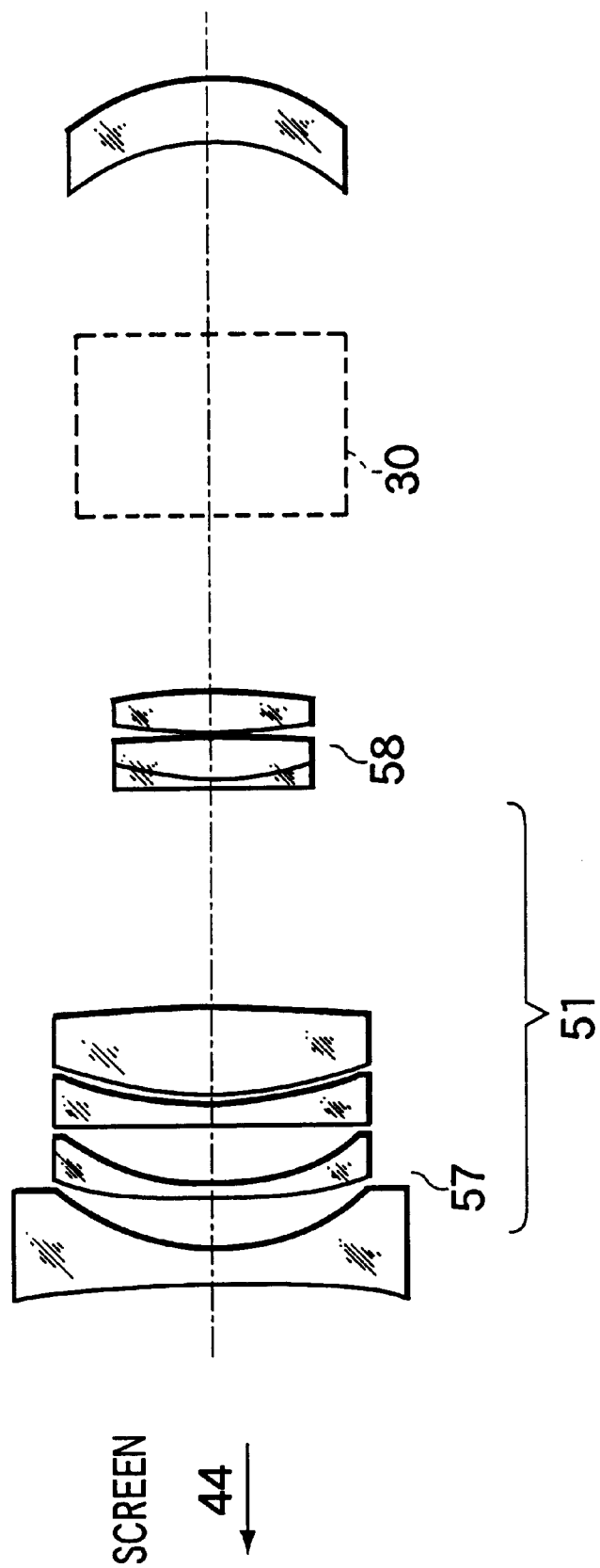
FIG. 14 is view showing in detail the structure of the projection lens system in the liquid crystal projector shown in FIG. 4B.
Figure 15:
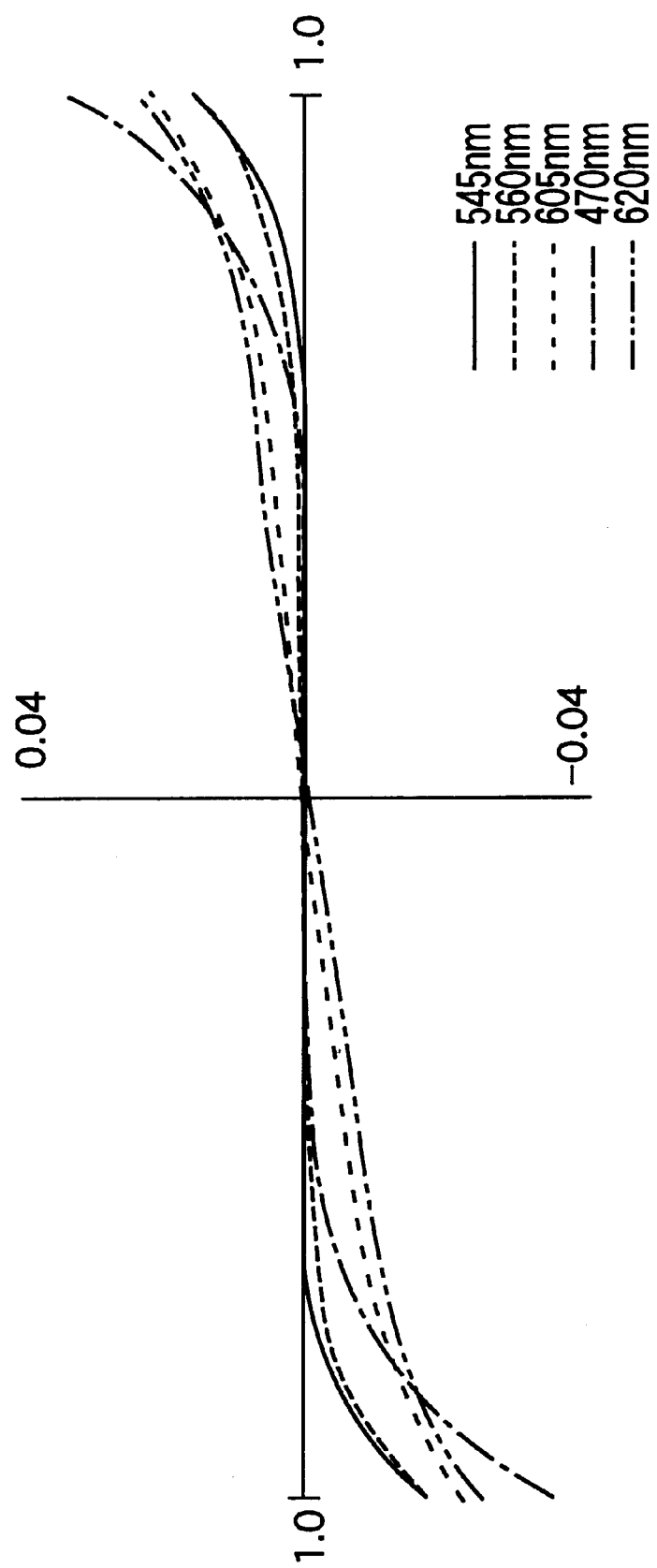
FIG. 15 shows a graph illustrating the comatic aberration of the optical system in the liquid crystal projector shown in FIG. 4B.
Figure 16:
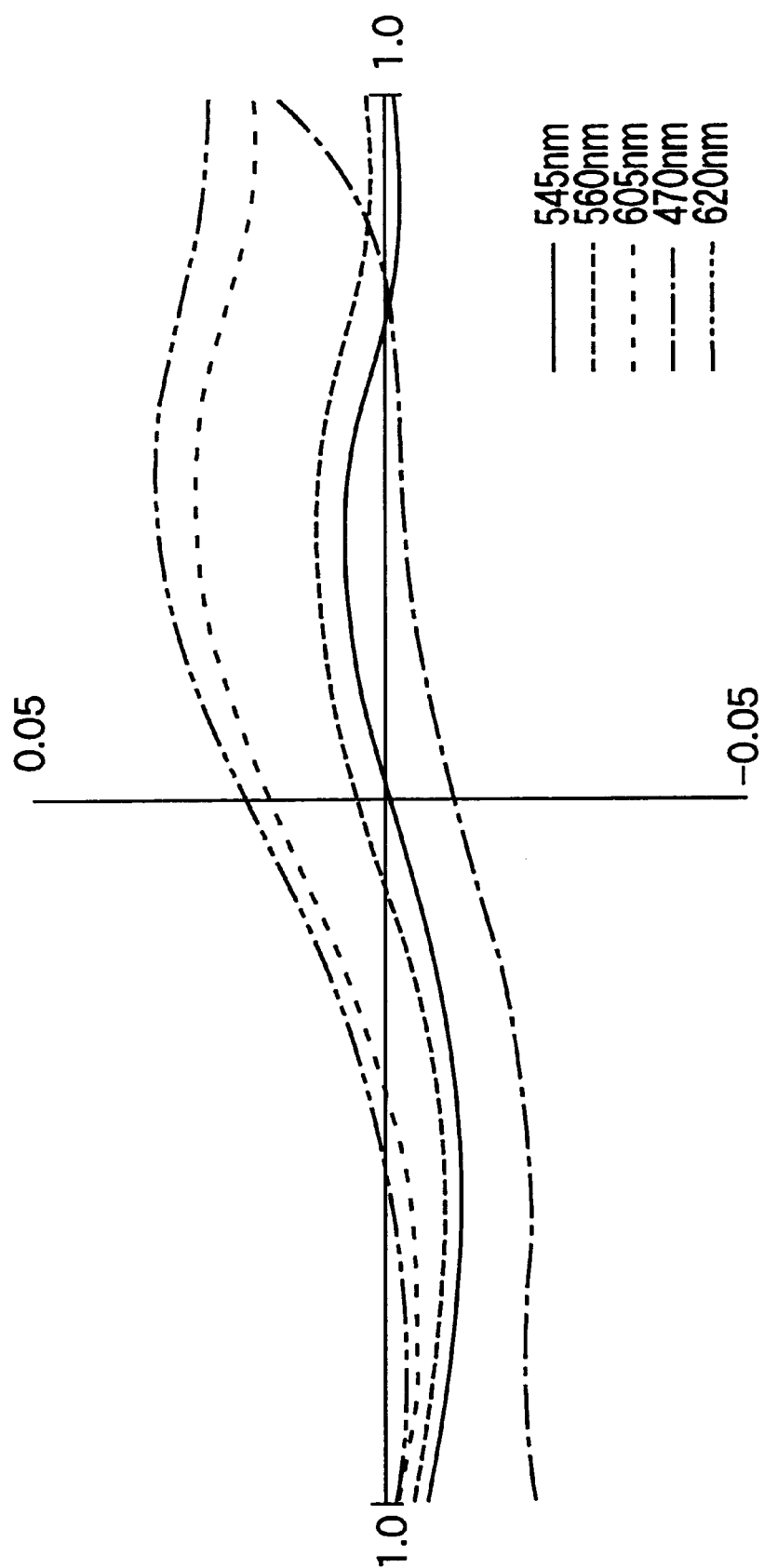
FIG. 16 shows another graph illustrating the comatic aberration of the optical system in the liquid crystal projector shown in FIG. 4B.
Figure 17:
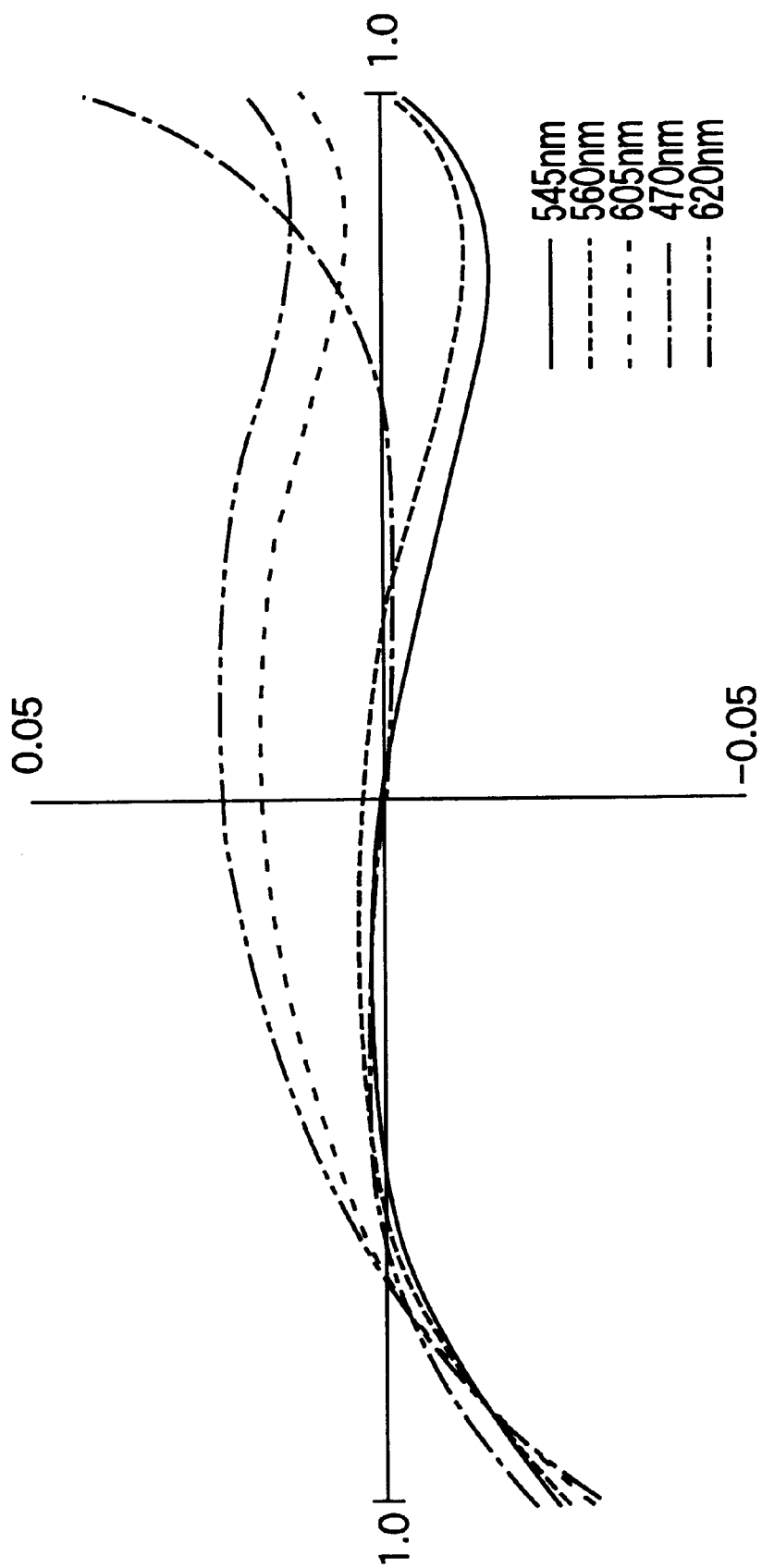
FIG. 17 shows still another graph illustrating the comatic aberration of the optical system in the liquid crystal projector shown in FIG. 4B.
Figure 18:
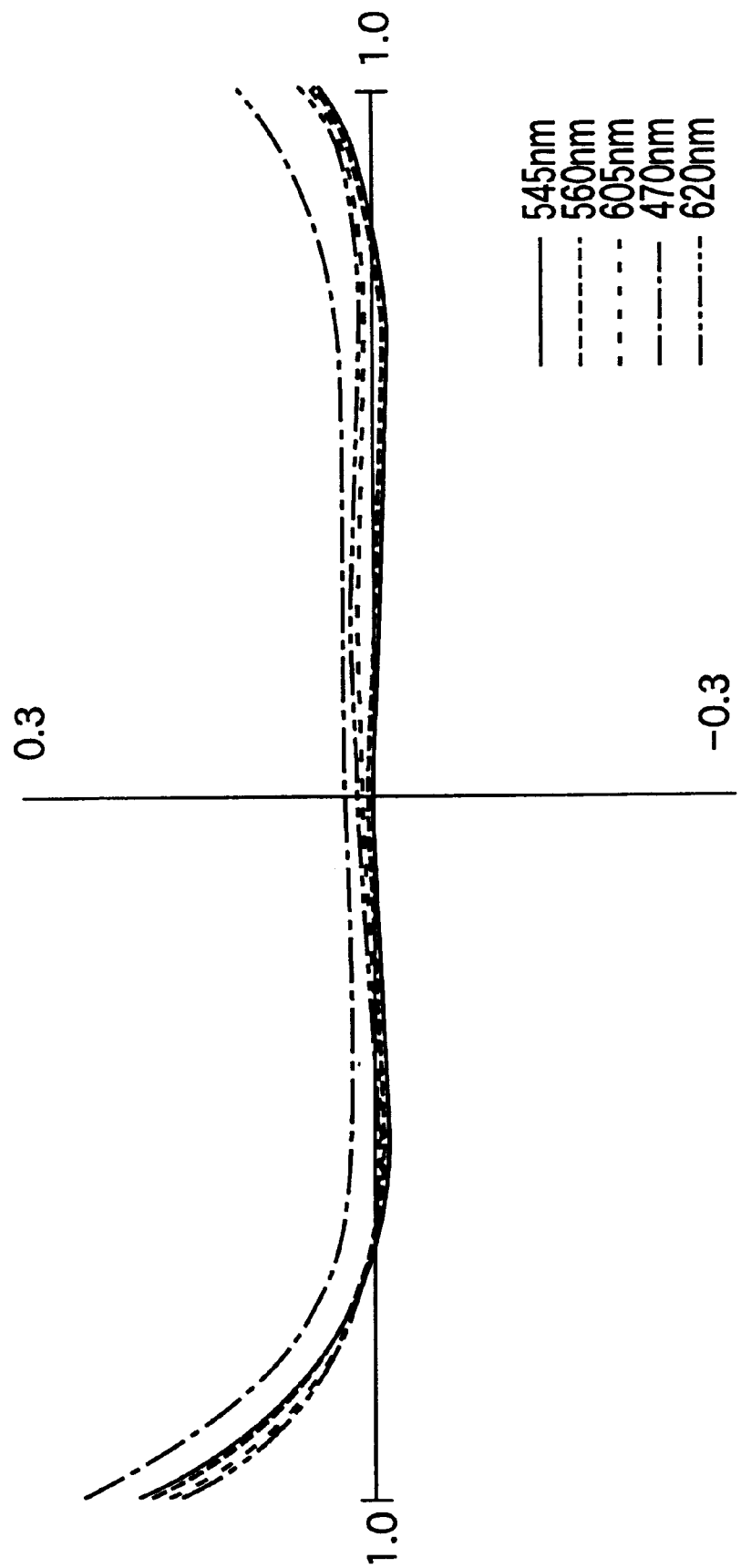
FIG. 18 shows yet another graph illustrating the comatic aberration of the optical system in the liquid crystal projector shown in FIG. 4B.
Figure 19:
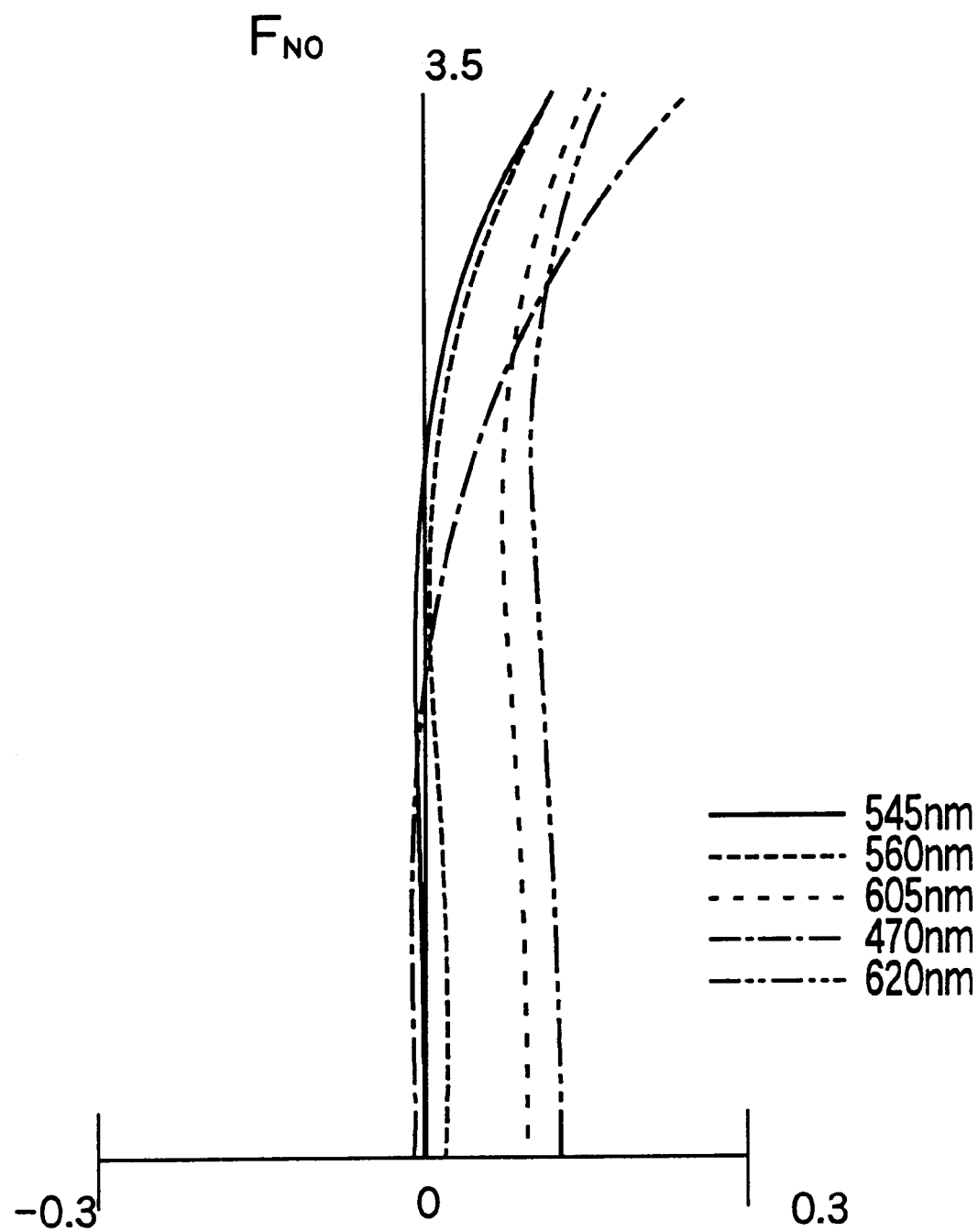
FIG. 19 shows a graph illustrating the spherical aberration of the optical system in the liquid crystal projector shown in FIG. 4B.
Figure 20:
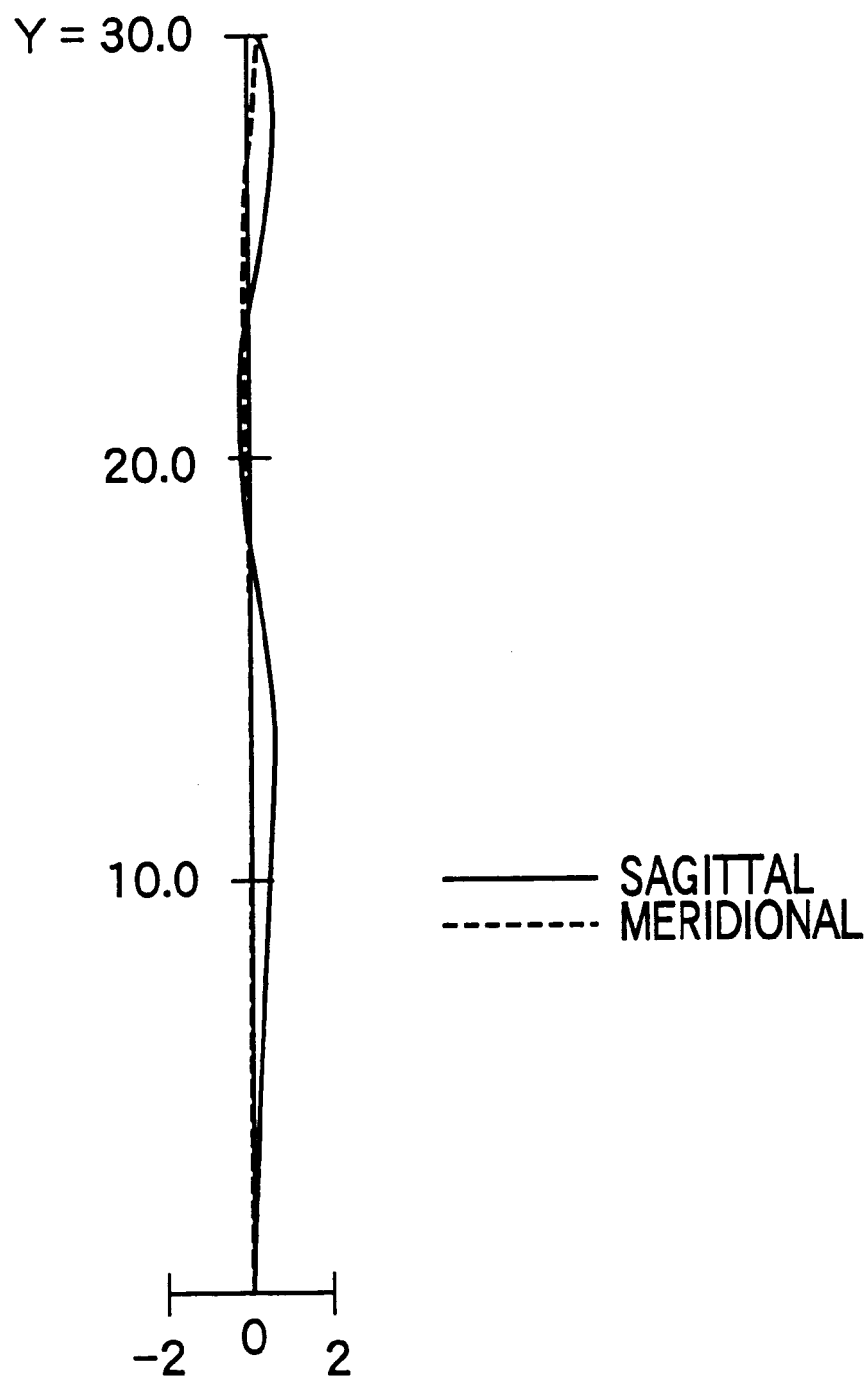
FIG. 20 shows a graph illustrating the astigmatic aberration of the optical system in the liquid crystal projector shown in FIG. 4B.
Figure 21:
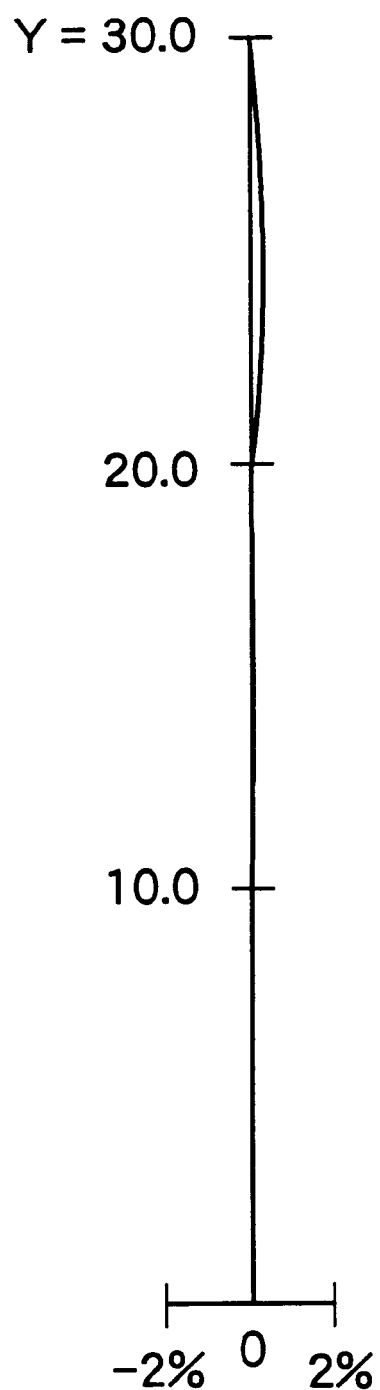
FIG. 21 shows a graph illustrating the distortion aberration of the optical system in the liquid crystal projector shown in FIG. 4B.
Figure 22:
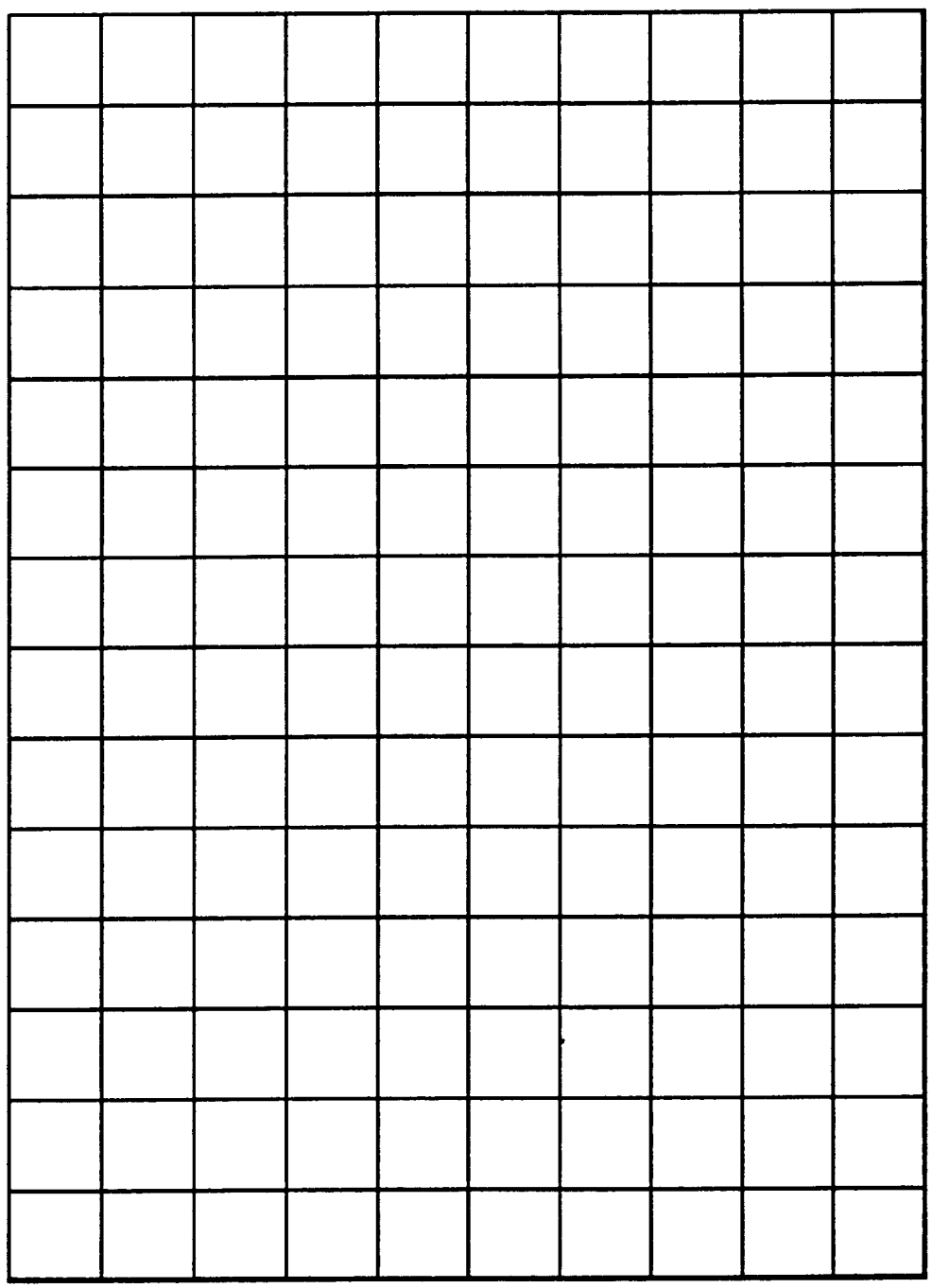
FIG. 22 is a view showing a simulation of an image subjected to the distortion aberration in the optical system in the liquid crystal projector shown in FIG. 4B.
Figures 23A, 23B:
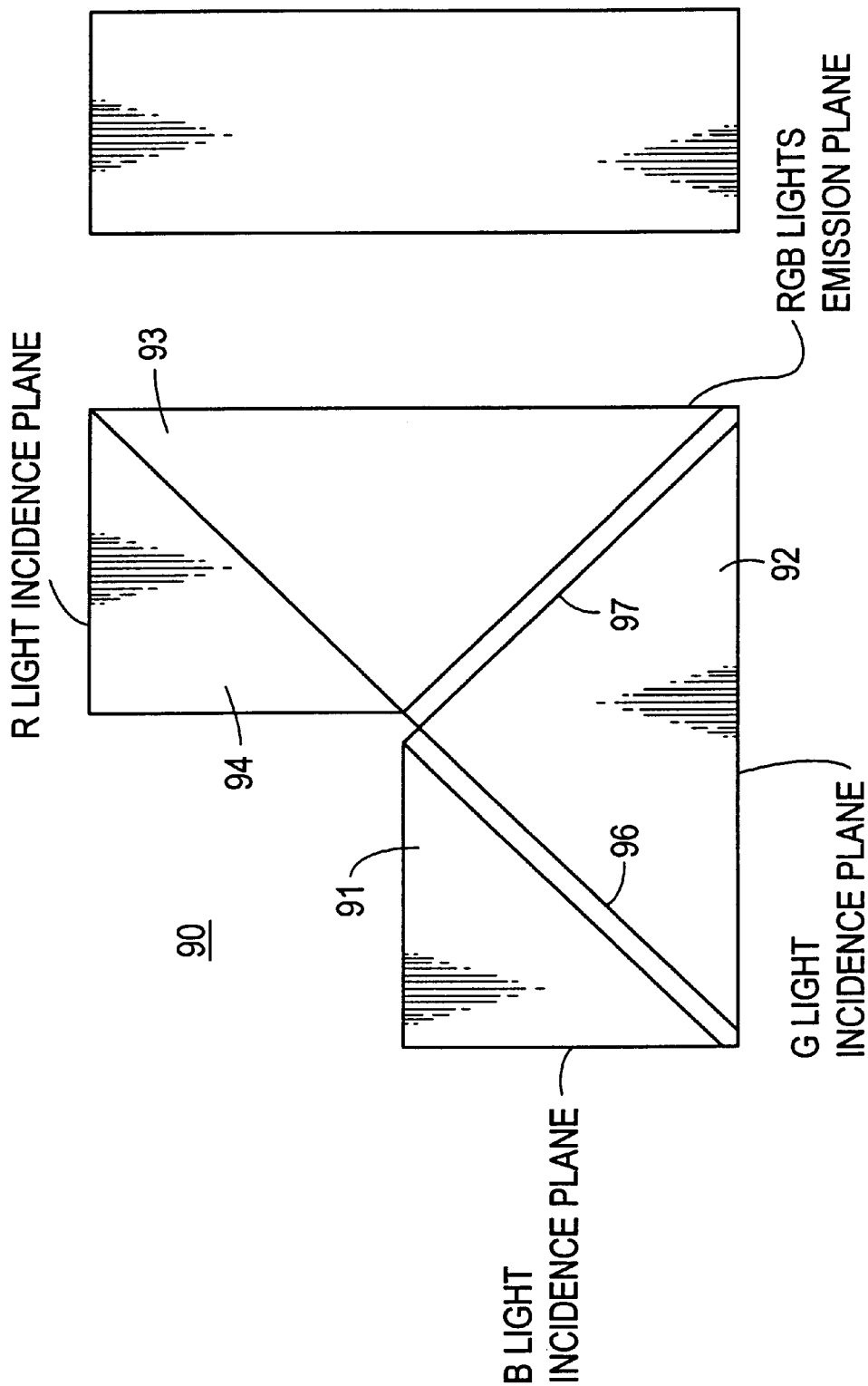
FIGS. 23A and 23B are elevation and right side elevation views of a conventional prism assembly.

In contrast, the constitution of the projector lens system 53 is shown in detail in FIG. 14. Specifically, the projection lens system 53 includes a lens group 58 constituted by three lenses and a lens group 57 constituted by four lenses. Incidentally, the aberration properties of the optical system shown in FIG. 4B are as shown in FIGS. 15 to 22.

As is known from the comparison between the projection lens systems shown in FIGS. 5 and 14, the number of lenses in the projection lens system used in the case where the prism assembly 30 of the second embodiment is employed becomes smaller by one than the number of lenses in the projection lens system employed in the case where the prism assembly 10 of the first embodiment is employed.

With respect to the prism assembly 30 produced by the above-mentioned method, the inventors of the present invention also conducted the same environment-resistance test as in the first embodiment. After the test, no change in the shape of the assembly 30 was observed. Also, no exfoliation was observed at the joined portion between the prisms. Further, no change in the dichroic properties was observed.

Other Modifications

Although the preferred embodiments of the present invention have been described above, it should be understood that the present invention is not limited thereto and that other modifications will be apparent to those skilled in the art without departing form the spirit of the invention.

Specifically, in the above-mentioned first and second embodiments, the prism assembly was employed as a prism assembly used for a liquid crystal projector. However, the prism assembly of the present invention is not limited thereto but applicable to prism assemblies used for other purposes so long as the prism assembly can perform color synthesis and color separation.

Advantageous Effects

As described above, according to the prism assembly in the first aspect of the present invention, since the prisms are made of plastics which allows the prism angles and the dimensions of the prism to be changed easily, and the dichroic layer is formed on a glass plate which exhibits excellent plane precision, the prism assembly can take various shapes and dimensions while keeping dichroic properties of the same level as in the conventional prism assembly.

According to the prism assembly in the second aspect of the present invention, since the prism assembly itself serves as a lens, the optical system placed after the prism assembly can have simple constitution.

According to the method for producing a prism assembly in the third aspect of the present invention, since the prism is formed by injection-molding plastics having light transmittivity, the dichroic layer is formed on a glass plate, and then the glass plate carrying the dichroic layer formed thereon is joined to a specific plane of the prism, the prism assembly in the first aspect of the present invention can be produced preferably.

According to the method for producing the prism assembly in the fourth aspect of the present invention, since at least one of the plane serving as a light incidence plane and the plane serving as a light emission plane is shaped in the form of a lens, the prism assembly in the second aspect of the present invention can be produced preferably.

What is claimed is:

1. A dichroic mirror device including a plurality of prisms which are provided in close contact with one another, comprising:

a convex light incident plane provided on a surface of at least one of the prisms;

a layer for color synthesis and color separation provided on at least one plane of at least one of the prisms; and a convex light emission plane provided on the surface of one of the prisms.

2. A method for producing a prism assembly, comprising:

producing a plurality of prisms with at least one convex light incident plane;

producing at least one prism with a convex light emission plane:

producing at least one layer for color synthesis or color separation;

placing the layer for color synthesis or color separation on at least one plane other than a convex plane of the prisms; and assembling the prisms in close contact with one another.

* * * * *